United States Patent
Kubota et al.

(10) Patent No.: US 9,709,970 B2
(45) Date of Patent: Jul. 18, 2017

(54) CONTROL DEVICE, SECURITY MANAGEMENT SYSTEM, AND SECURITY MANAGEMENT METHOD

(71) Applicant: KABUSHIKI KAISHA YASKAWA DENKI, Kitakyushu-shi (JP)

(72) Inventors: Yumie Kubota, Fukuoka (JP); Kiyoshi Hirakawa, Fukuoka (JP); Yuichi Haruki, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 602 days.

(21) Appl. No.: 14/218,990

(22) Filed: Mar. 19, 2014

(65) Prior Publication Data
US 2015/0081047 A1    Mar. 19, 2015

(30) Foreign Application Priority Data
Sep. 13, 2013  (JP) .................................. 2013-191039

(51) Int. Cl.
G05B 15/02    (2006.01)
G06F 21/10    (2013.01)

(52) U.S. Cl.
CPC ............. *G05B 15/02* (2013.01); *G06F 21/10* (2013.01)

(58) Field of Classification Search
CPC ................................ G05B 15/02; G06F 21/10
USPC ........................................................ 700/40
See application file for complete search history.

(56) References Cited

U.S. PATENT DOCUMENTS

| | | |
|---|---|---|
| 2002/0072350 A1 | 6/2002 | Fukuzato |
| 2002/0174354 A1* | 11/2002 | Bel ............... G06F 21/10 713/193 |
| 2004/0098348 A1* | 5/2004 | Kawasaki ....... G06F 21/10 705/59 |
| 2007/0031116 A1 | 2/2007 | Takatsuka et al. |

(Continued)

FOREIGN PATENT DOCUMENTS

| | | |
|---|---|---|
| EP | 2604397 A2 | 6/2013 |
| JP | 2002-183093 | 6/2002 |

(Continued)

OTHER PUBLICATIONS

Japanese Office Action for corresponding JP Application No. 2013-191039, Mar. 22, 2016.

(Continued)

*Primary Examiner* — Robert Fennema
*Assistant Examiner* — Jigneshkumar Patel
(74) *Attorney, Agent, or Firm* — Mori & Ward, LLP

(57) ABSTRACT

A central processing unit of a control device includes: a control calculation unit that performs calculation on the basis of storage content of a nonvolatile storage unit and controls a machine; an update unit that accepts operation input in a first maintenance mode or a second maintenance mode, which has a narrower operable range than the first maintenance mode, and updates the storage content of the nonvolatile storage unit in accordance with the operation input; a security management unit that determines permission or prohibition of the operation input in the first maintenance mode with the use of a hardware key; and a security management unit that determines permission or prohibition of the operation input in the second maintenance mode without the use of the hardware key.

18 Claims, 8 Drawing Sheets

(56) References Cited

U.S. PATENT DOCUMENTS

| | | | |
|---|---|---|---|
| 2007/0112683 A1* | 5/2007 | Gleichauf | G06Q 99/00 705/59 |
| 2007/0133614 A1 | 6/2007 | Sim et al. | |
| 2009/0022314 A1 | 1/2009 | Wada et al. | |
| 2010/0333214 A1 | 12/2010 | Tsuboi | |
| 2011/0066721 A1 | 3/2011 | Shinomiya | |
| 2012/0311701 A1 | 12/2012 | Kawabata | |

FOREIGN PATENT DOCUMENTS

| | | | |
|---|---|---|---|
| JP | 2002-185579 | | 6/2002 |
| JP | 2004-157845 | | 6/2004 |
| JP | 2004157845 | * | 6/2004 |
| JP | 2007-42204 | | 2/2007 |
| JP | 2007-157135 | | 6/2007 |
| JP | 2009-075793 | | 4/2009 |
| JP | 2011-003085 | | 1/2011 |
| JP | 2011-008659 | | 1/2011 |
| JP | 2012-248108 | | 12/2012 |
| WO | WO 2006/085584 | | 8/2006 |

OTHER PUBLICATIONS

Korean Office Action for corresponding KR Application No. 10-2014-0032043, Oct. 8, 2015.
Japanese Office Action for corresponding JP Application No. 2013-191039, Aug. 18, 2015.
Extended European Search Report for corresponding EP Application No. 14156739.6-1870, Mar. 3, 2015.
Korean Office Action for corresponding KR Application No. 10-2014-0032043, Apr. 29, 2016.
Chinese Office Action for corresponding CN Application No. 201410103582.6, Jan. 3, 2017.

* cited by examiner

CONTROL DEVICE, SECURITY MANAGEMENT SYSTEM, AND SECURITY MANAGEMENT METHOD

CROSS-REFERENCE TO RELATED APPLICATION

This application is based upon and claims the benefit of priority from Japanese Patent Application No. 2013-191039, filed Sep. 13, 2013, the entire contents of which are incorporated herein by reference.

BACKGROUND

1. Field

The present disclosure relates to a control device, a security management system, and a security management method.

2. Description of the Related Art

Industrial machines automatically controlled by a control device, such as a robot or an NC machine tool, have been widely put into practical use. Since the control device controls the industrial machine on the basis of storage content such as control parameters, control programs, or various settings stored in advance, the change of the storage content significantly affects the operation of the industrial machine Therefore, the storage content needs to be managed with high reliability. In regard to the management, Japanese Patent Application Laid-Open No. 2012-248108 discloses an image processing apparatus which allows the setting to be changed only when a hardware key is connected to the image processing apparatus and a predetermined operation, such as input of a password, is performed.

SUMMARY

A control device according to the present disclosure includes: a control calculation unit that controls a machine by performing calculation on the basis of the storage content of a nonvolatile storage unit; an update unit that accepts operation input in a first maintenance mode or a second maintenance mode with a narrower operable range than the first maintenance mode and updates the storage content of the nonvolatile storage unit in accordance with the operation input; a first security management unit that determines permission or prohibition of the operation input in the first maintenance mode using a hardware key; and a second security management unit that determines permission or prohibition of the operation input in the second maintenance mode without using a hardware key.

A security management system according to the present disclosure includes: the control device; a data generation device that generates a license file or a security code; and a terminal device that writes the license file generated by the data generation device in the hardware key.

A security management method according to the present disclosure is a security management method for a control device that has a nonvolatile storage unit and which controls a machine on the basis of storage content of the nonvolatile storage unit, and the method includes: accepting operation input in a first maintenance mode or a second maintenance mode with a narrower operable range than the first maintenance mode and updating the storage content of the nonvolatile storage unit in accordance with the operation input; conducting first security check to determine permission or prohibition of the operation input in the first maintenance mode using a hardware key before updating the storage content in the first maintenance mode; and conducting second security check to determine permission or prohibition of the operation input in the second maintenance mode without using a hardware key before updating the storage content in the second maintenance mode.

DETAILED DESCRIPTION

Figure 1:
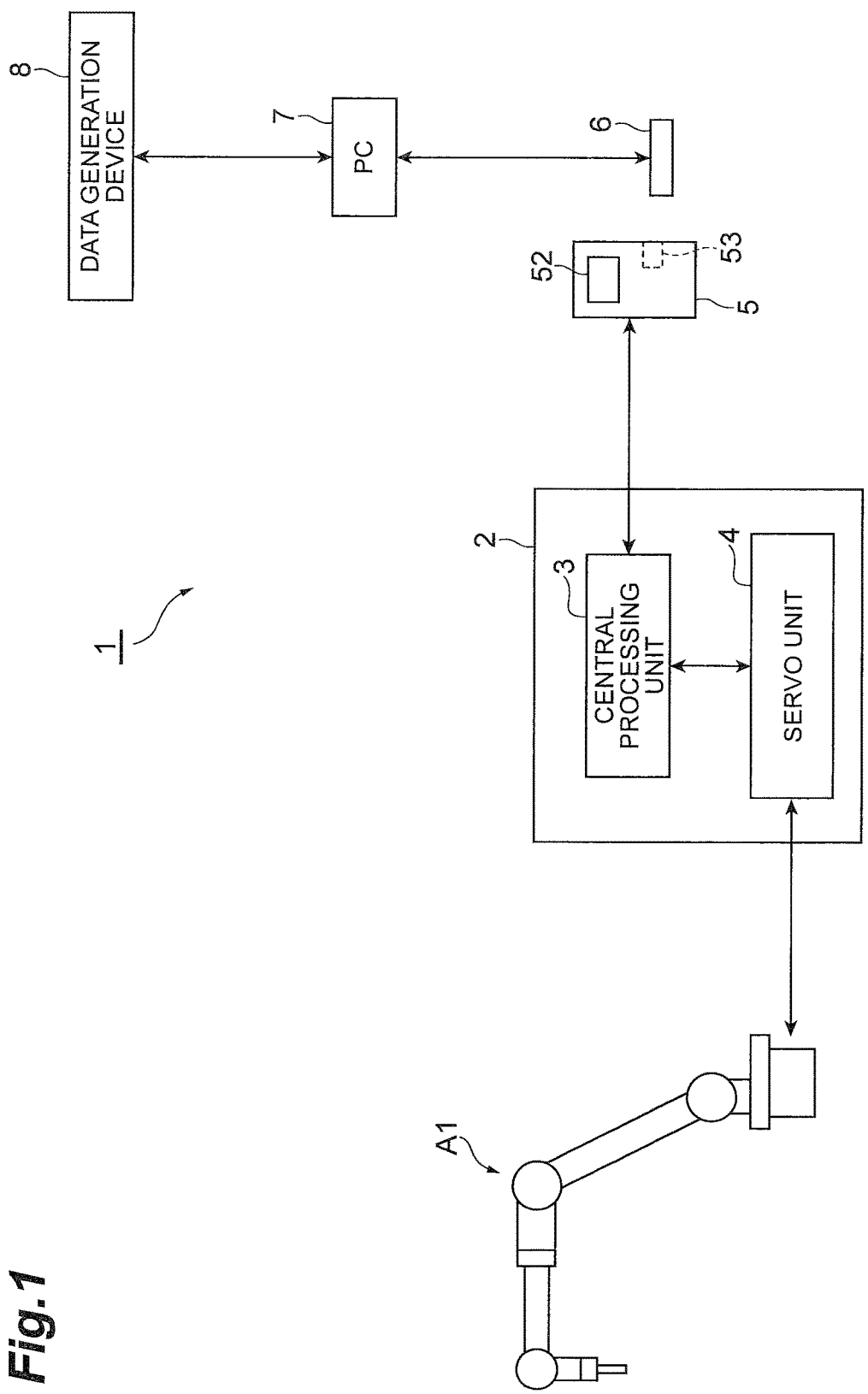
FIG. 1 is a schematic diagram illustrating a structure of a security management system.

An embodiment is hereinafter described in detail with reference to the drawings. The same elements or elements with the same function are denoted with the same reference numeral and the description will not be repeated.

Figure 2:
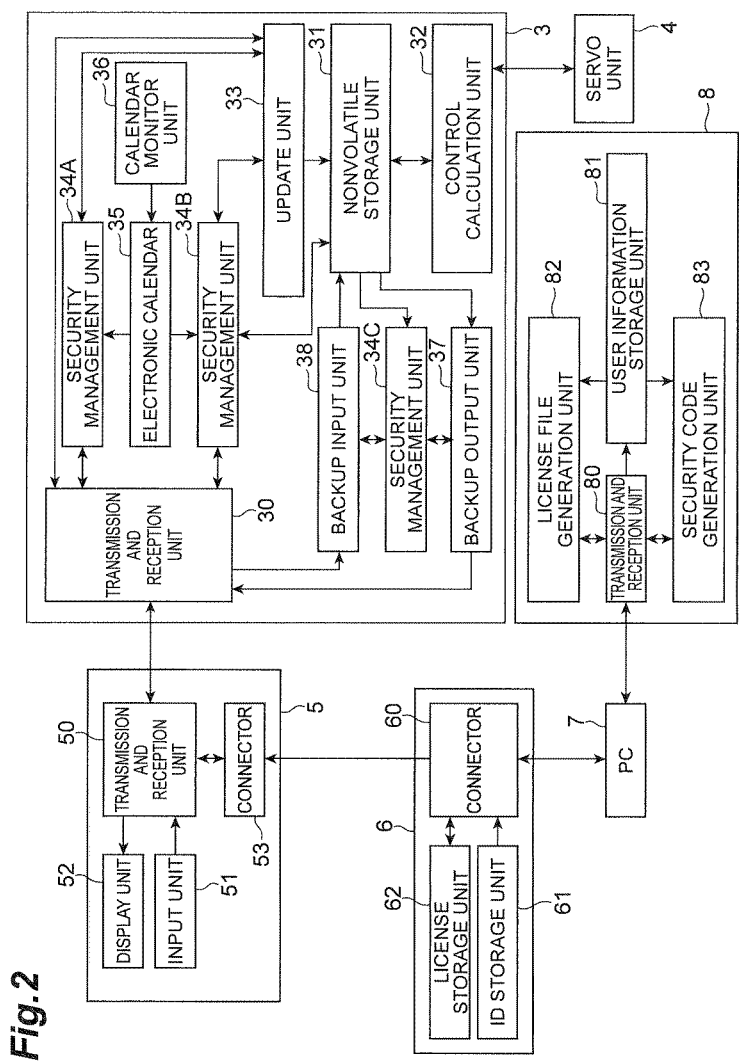
FIG. 2 is a block diagram illustrating a functional structure of a security management system.

[Security management system] As illustrated in FIGS. 1 and 2, a security management system 1 includes a controller 2, a hardware key 6, a terminal device 7, and a data generation device 8.

The controller 2 is a control device for an articulated robot (machine) A1, and includes a central processing unit 3, a servo unit 4, and a teaching pendant 5. The servo unit 4 supplies power to an actuator of the articulated robot A1 in response to the input of the instruction.

The central processing unit 3 performs various calculations, and controls the articulated robot A1 via the servo unit 4. The central processing unit 3 includes a transmission and reception unit 30, a nonvolatile storage unit 31, a control calculation unit 32, an update unit 33, security management units 34A to 34C, an electronic calendar 35, a calendar monitor unit 36, a backup output unit 37, and a backup input unit 38.

The transmission and reception unit 30 transmits and receives various kinds of data to and from the teaching pendant 5. The nonvolatile storage unit 31 is, for example, a nonvolatile semiconductor memory, and has a unique identifier (hereinafter called "memory ID"). The nonvolatile storage unit 31 stores control parameters, control programs, various settings, and the like. The control calculation unit 32 performs various calculations on the basis of the storage content of the nonvolatile storage unit 31 and controls the articulated robot A1 via the servo unit 4. In other words, the controller 2 controls the articulated robot A1 on the basis of the storage content of the nonvolatile storage unit 31.

The update unit 33 accepts the operation input via the transmission and reception unit 30, and updates the storage content of the nonvolatile storage unit 31 in response to the operation input. The update unit 33 accepts the operation input in a first maintenance mode or a second maintenance mode. The operable range in the second maintenance mode is narrower than that in the first maintenance mode. For example, the first maintenance mode permits the update of the storage content in regard to all the functions of the controller 2, while the second maintenance mode permits the update of the storage content in regard to just a part of the functions of the controller 2.

The security management unit (first security management unit) 34A determines the permission or prohibition of the operation input in the first maintenance mode. The security management unit 34A acquires a license file (described below) from a hardware key 6 via the transmission and reception unit 30, and determines the permission or prohibition of the operation input in the first maintenance mode using the license file. In other words, the security management unit 34A uses the hardware key 6.

The security management unit (second security management unit) 34B determines the permission or prohibition of the operation input in the second maintenance mode. The security management unit 34B acquires a security code (described below) via the transmission and reception unit 30, and determines the permission or prohibition of the operation input in the second maintenance mode using the security code. The security code is input by a user. In other words, the security management unit 34B does not use the hardware key 6.

The electronic calendar 35 counts the passage time with a timer, and outputs the current date information to the security management unit 34A and the security management unit 34B. The date information includes the information of the year, month, day, and time, and is used in comparison to the expiration date of the license file or the security code. The electronic calendar 35 accepts the operation input via the transmission and reception unit 30, and updates the current date in response to the operation input.

The calendar monitor unit 36 monitors the electronic calendar 35 and restricts the update of the electronic calendar 35. Specifically, after the initial setting of the date information for the electronic calendar 35, the calendar monitor unit 36 restricts the number of shifts of the current time toward the past by a certain period of time or more to be within a predetermined number of times. The certain period of time is 24 hours, for example. The predetermined number of times is five, for example.

The backup output unit 37 generates a first file including first data corresponding to the storage content of the nonvolatile storage unit 31, a check value (described below) calculated for the first data, and a memory ID of the nonvolatile storage unit 31, and outputs the first file via the transmission and reception unit 30.

The backup input unit 38 acquires the first file via the transmission and reception unit 30, and recovers the storage content of the nonvolatile storage unit 31 on the basis of the first data included in the first file.

The security management unit (third security management unit) 34C determines the permission or prohibition of the recovery of the storage content on the basis of the file acquired by the backup input unit 38.

The teaching pendant 5 is a device for the input, and is connected to the central processing unit 3 via a cable. The teaching pendant 5 includes a transmission and reception unit 50, an input unit 51, a display unit 52, and a connector 53.

The transmission and reception unit 50 transmits and receives various kinds of data to and from the central processing unit 3. The input unit 51 accepts the operation input from a user through a plurality of input buttons, for example, and transmits the input content to the central processing unit 3 by outputting the content to the transmission and reception unit 50. The display unit 52 is, for example, a liquid crystal monitor, and displays the content transmitted to or received from the central processing unit 3. The connector 53 can have, for example, a storage medium such as a USB memory inserted thereto. The connector 53 can have the hardware key 6 inserted thereto. The connector 53 can also have a storage medium for the recovery of the storage content inserted thereto.

The hardware key 6 is, for example, a storage medium such as a USB memory, and includes a connector 60, an ID storage unit 61, and a license storage unit 62. The connector 60 is connected to the connector 53 of the teaching pendant 5 or a connector (not illustrated) of the terminal device 7. The ID storage unit 61 stores the unique identifier of the hardware key 6 (hereinafter the identifier is called "key ID"), and outputs the key ID to the outside via the connector 60. The license storage unit 62 stores the license file.

The terminal device 7 is, for example, a computer connected to the data generation device 8 via a network line, and requests the data generation device 8 to generate the license file or the security code and acquires the generated license file or security code from the data generation device 8. The network line is, for example, VPN (Virtual Private Network). The terminal device 7 writes the license file generated by the data generation device 8 in the hardware key 6.

The data generation device 8 is, for example, a server, and generates the license file or the security code in response to the request from the terminal device 7 and transmits the generated license file or security code to the terminal device 7. The data generation device 8 includes a transmission and reception unit 80, a user information storage unit 81, a license file generation unit 82, and a security code generation unit 83.

The transmission and reception unit 80 transmits and receives the data to and from the terminal device 7 via the network line.

The user information storage unit 81 stores the information for each user that requests the license file or the security code. This information includes user identification information such as a user name, and the key ID of the hardware key 6 owned by the user. The information is registered in advance in the data generation device 8. If a user has lost the hardware key 6, the user needs to re-register the key ID of the new hardware key 6 in the data generation device 8. The user information storage unit 81 prohibits the re-registration of the hardware key 6 when the number of times of registering the hardware key 6 by the same user has reached a predetermined number. This can suppress that the number of hardware keys 6 is increased to deteriorate the reliability of the security management.

The license file generation unit 82 generates the license file in response to the request from the terminal device 7. The security code generation unit 83 generates the security code in response to the request from the terminal device 7.

[Security management method] The security management system 1 executes the security management method according to this embodiment. This security management method is a security management method for the controller 2. The description is hereinafter made of the procedure for executing the security management method.

(Procedure for issuing license file for first maintenance mode) The license file for the first maintenance mode is issued by the terminal device 7 and the license file generation unit 82. Prior to this process, the hardware key 6 is inserted into the terminal device 7.

Figure 3:
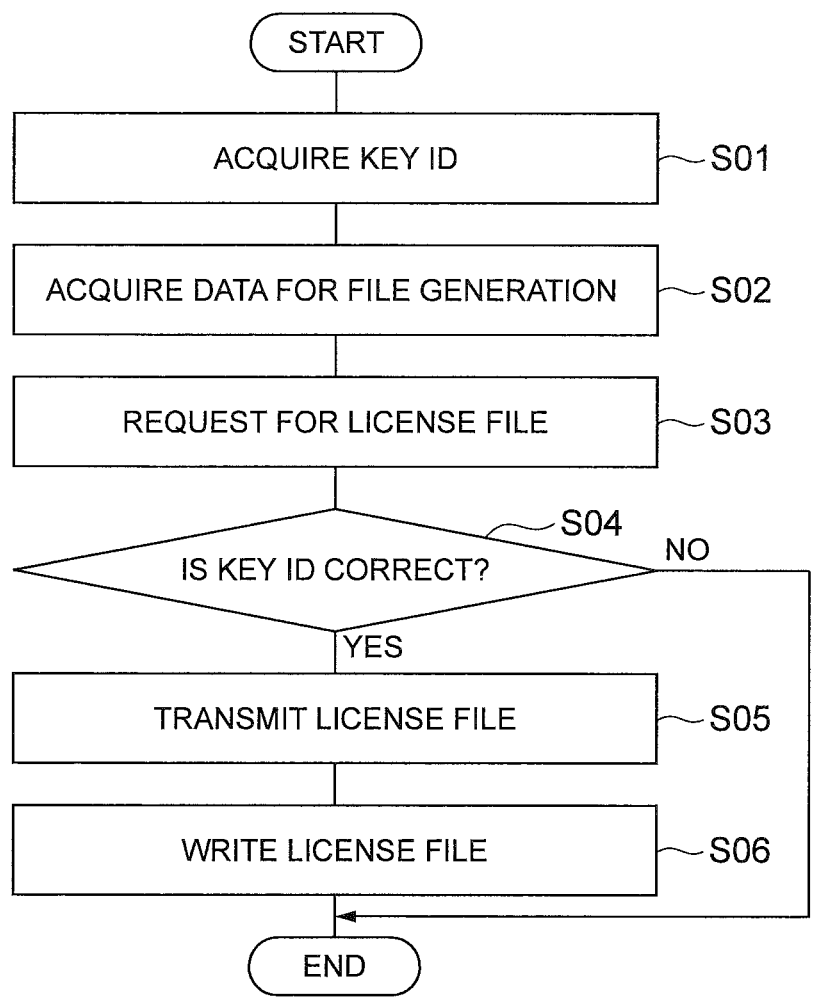
FIG. 3 is a flowchart illustrating a procedure for issuing a license file for a first maintenance mode.

As illustrated in FIG. 3, the terminal device 7 acquires the key ID of the hardware key 6 (S01).

Next, the terminal device 7 acquires data for generating the license file (hereinafter called "data for file generation") (S02). The data for file generation is input by a user. The data includes the user identification information and a password set by the user.

Next, the terminal device 7 transmits the key ID and the data for file generation to the data generation device 8, and requests the issuing of the license file (S03). The key ID and the data for file generation are acquired by the license file generation unit 82 via the transmission and reception unit 80.

Next, the license file generation unit 82 checks if the key ID is correct or not by referring to the user information storage unit 81 (S04).

Specifically, if the combination of the key ID acquired from the terminal device 7 and the user identification information in the data for file generation coincides with that registered in advance in the user information storage unit 81, the key ID is determined as being correct. If the key ID is incorrect, the process is cancelled and the license file is not issued.

When the key ID is correct, the license file generation unit 82 generates the license file and transmits the license file from the transmission and reception unit 80 to the terminal device 7 (S05). The license file is obtained by encrypting the information including the key ID for comparison, the password, and the expiration date, for example. The password included in the license file is the password included in the data for file generation.

Next, the terminal device 7 writes the license file transmitted from the data generation device 8 in the license storage unit 62 of the hardware key 6 (S06).

Thus, the issuing of the license file is completed. The order of Steps S01 to S06 can be changed as appropriate. The hardware key 6 in which the license file has been written is inserted into the connector 53 of the teaching pendant 5 and is used for updating the storage content in the first maintenance mode.

(Procedure for updating storage content in first maintenance mode) In the first maintenance mode, the storage content is updated by the update unit 33 and the security management unit 34A. The hardware key 6 in which the license file has been written is inserted into the connector 53 of the teaching pendant 5 in advance.

Figure 4:
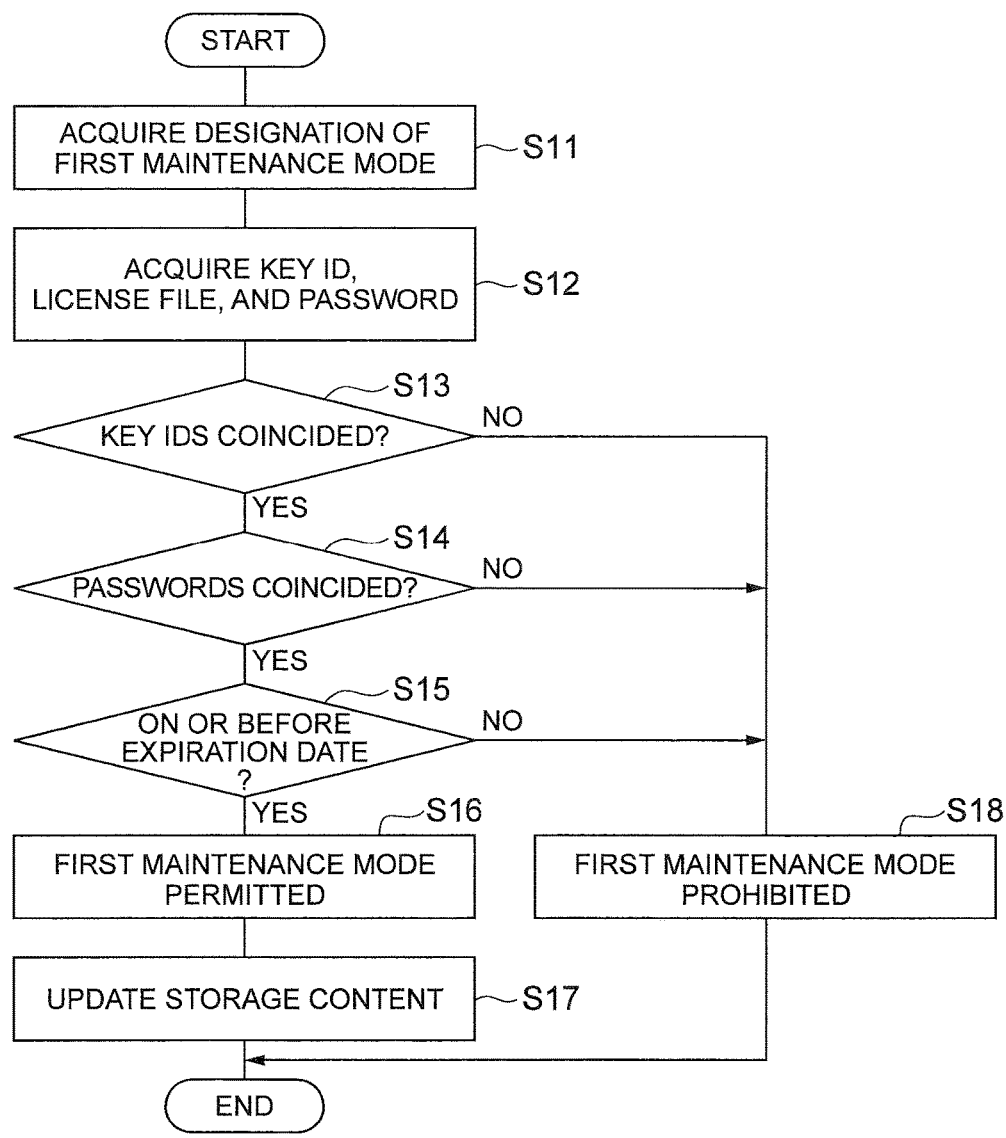
FIG. 4 is a flowchart illustrating a procedure for updating storage content in the first maintenance mode.

As illustrated in FIG. 4, the update unit 33 acquires the designation of the operation input request in the first maintenance mode (S11). In the first maintenance mode, the operation input request is input by a user through the input unit 51 and acquired by the update unit 33 via the transmission and reception unit 50 and the transmission and reception unit 30.

Upon the acquisition of the operation input request in the first maintenance mode by the update unit 33, the security management unit 34A acquires the key ID, the license file, and the password (S12). The key ID and the license file are output from the ID storage unit 61 and the license storage unit 62 of the hardware key 6, respectively, and are acquired by the security management unit 34A via the transmission and reception unit 50 and the transmission and reception unit 30. The password is input by a user through the input unit 51, and acquired by the security management unit 34A via the transmission and reception unit 50 and the transmission and reception unit 30.

Next, the security management unit 34A checks if the key ID acquired from the hardware key 6 coincides with the key ID for comparison included in the license file (S13). When the key IDs do not coincide with each other, the security management unit 34A prohibits the update of the storage content in the first maintenance mode (S18) and cancels the process.

When the key IDs coincide with each other, the security management unit 34A checks if the password input by the user coincides with the password included in the license file (S14). If the passwords do not coincide with each other, the security management unit 34A prohibits the update of the storage content in the first maintenance mode (S18) and cancels the process.

When the passwords coincide with each other, the security management unit 34A checks if the current date information output from the electronic calendar 35 is on or before the expiration date included in the license file (S15). If the current date information is after the expiration date included in the license file, the security management unit 34A prohibits the update of the storage content in the first maintenance mode (S18) and cancels the process.

When the current date information is on or before the expiration date included in the license file, the security management unit 34A permits the update of the storage content in the first maintenance mode (S16). Thus, the security management unit 34A conducts first security check for permitting or prohibiting the operation input in the first maintenance mode.

Next, the update unit 33 acquires data for the update, and updates the storage content in the nonvolatile storage unit 31 on the basis of the data (S17). For example, the update unit 33 overwrites the data in the nonvolatile storage unit 31 with the data for the update. The data for the update is input by a user, for example, through the input unit 51 and are acquired by the update unit 33 via the transmission and reception unit 50 and the transmission and reception unit 30.

Thus, the update of the storage content in the first maintenance mode is completed. The data for the update may be acquired from the storage medium inserted into the connector 53 via the transmission and reception unit 50 and the transmission and reception unit 30. The data for the update may be stored in the hardware key 6 separate from the license file or stored in another storage medium (not illustrated) connected to the teaching pendant 5 or the controller 2. The order of Steps S11 to S18 can be changed as appropriate.

(Procedure for issuing security code for second maintenance mode) The security code for the second maintenance mode is issued by the terminal device 7 and the security code generation unit 83.

Figure 5:
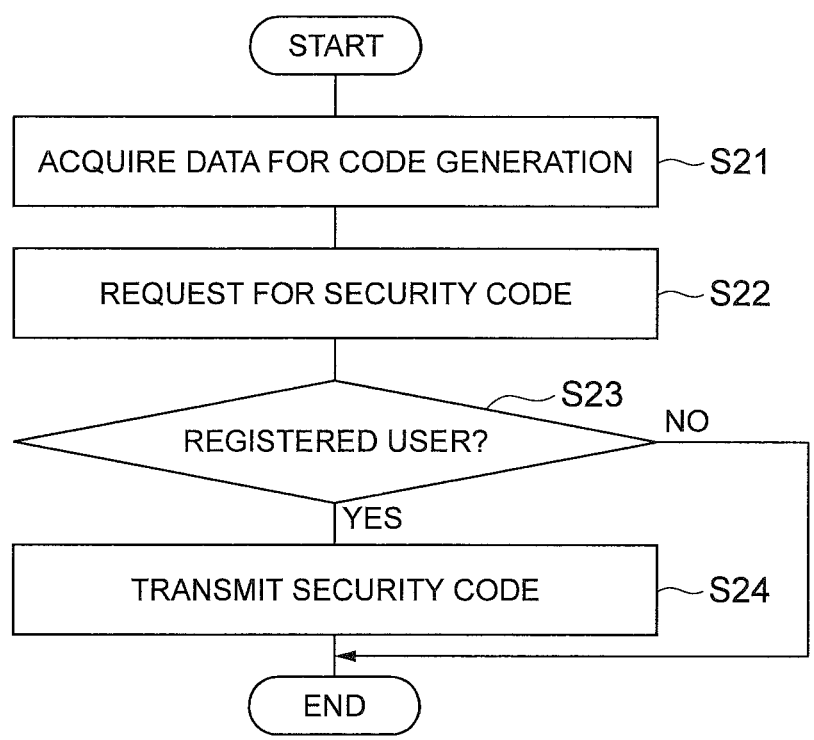
FIG. 5 is a flowchart illustrating a procedure for issuing a security code for a second maintenance mode.

As illustrated in FIG. 5, the terminal device 7 acquires the data for the security code generation (hereinafter the data is referred to as "data for code generation") (S21). The data for code generation is input by a user. The data includes the memory ID of the nonvolatile storage unit 31, and the user identification information. The memory ID can be known by the teaching pendant 5.

Next, the terminal device 7 transmits the data for code generation to the data generation device 8, and requests the issuing of the security code (S22). The data for code generation is acquired by the security code generation unit 83 via the transmission and reception unit 80.

Next, the security code generation unit 83 checks if the user identification information is registered in advance or not by referring to the user information storage unit 81 (S23). If the user identification information is not registered in advance, the process is cancelled and the security code is not issued.

If the user identification information is registered in advance, the security code generation unit 83 generates the security code and transmits the security code from the transmission and reception unit 80 to the terminal device 7 (S24). Thus, the user is notified of the security code. The security code includes the memory ID for comparison and the expiration date. The memory ID for comparison is the memory ID included in the data for code generation.

The issuing of the security code is thus completed. The request and the notification of the security code are not necessarily executed via the terminal device 7 and may be executed through conversation via a telephone line with an operator on the data generation device 8 side. The order of Steps S21 to S24 can be changed as appropriate.

(Procedure for updating storage content in second maintenance mode) In the second maintenance mode, the storage content is updated by the update unit 33 and the security management unit 34B.

Figure 6:
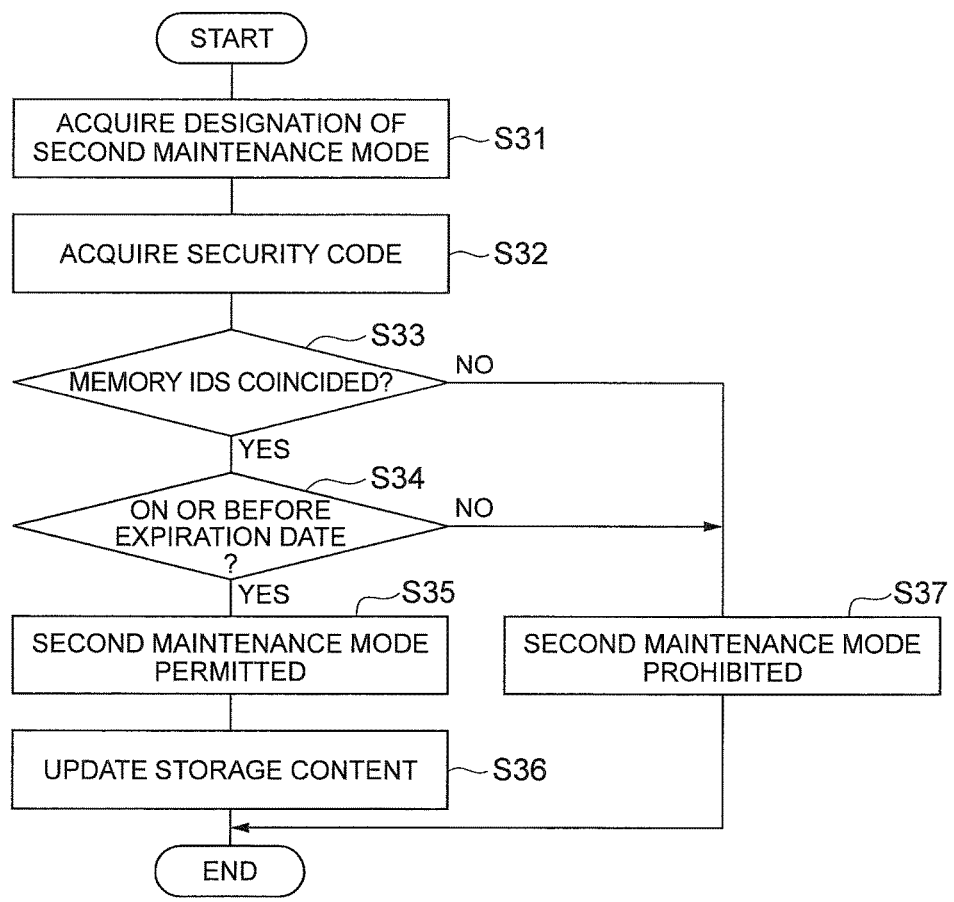
FIG. 6 is a flowchart illustrating a procedure for updating the storage content in the second maintenance mode.

As illustrated in FIG. 6, the update unit 33 acquires the operation input request in the second maintenance mode (S31). The operation input request in the second maintenance mode is input by a user through the input unit 51 and is acquired by the update unit 33 via the transmission and reception unit 50 and the transmission and reception unit 30.

Upon the acquisition of the operation input request in the second maintenance mode by the update unit 33, the security management unit 34B acquires the security code (S32). The security code is input by a user to the input unit 51, and is acquired by the security management unit 34B via the transmission and reception unit 50 and the transmission and reception unit 30.

Next, the security management unit 34B checks if the memory ID of the nonvolatile storage unit 31 coincides with the memory ID for comparison included in the security code (S33). When the memory IDs do not coincide with each other, the security management unit 34B prohibits the update of the storage content in the second maintenance mode (S37) and cancels the process.

When the memory IDs coincide with each other, the security management unit 34B checks if the current date information output from the electronic calendar 35 is on or before the expiration date included in the security code (S34). If the current date information is after the expiration date included in the security code, the security management unit 34B prohibits the update of the storage content in the second maintenance mode (S37) and cancels the process.

If the current date information is on or before the expiration date included in the security code, the security management unit 34B permits the update of the storage content in the second maintenance mode (S35). Thus, the security management unit 34B conducts second security check for permitting or prohibiting the operation input in the second maintenance mode.

Next, the update unit 33 acquires the data for the update, and updates the storage content of the nonvolatile storage unit 31 on the basis of the data (S36). For example, the update unit 33 overwrites the data in the nonvolatile storage unit 31 with the data for the update. The data for the update is input by a user, for example, through the input unit 51 and is acquired by the update unit 33 via the transmission and reception unit 50 and the transmission and reception unit 30.

The update of the storage content in the second maintenance mode is thus completed. The data for the update may be acquired from the storage medium inserted into the connector 53 via the transmission and reception unit 50 and the transmission and reception unit 30. The data for the update may be stored in the hardware key 6 or stored in another storage medium (not illustrated) connected to the teaching pendant 5 or the controller 2. The order of Steps S31 to S37 can be changed as appropriate.

(Procedure for outputting files for recovery) The backup files used for the recovery are output by the backup output unit 37 and the security management unit 34C. Before this output process, a storage medium for the backup is inserted into the connector 53 of the teaching pendant 5. Note that the storage medium for the backup may be connected to the controller 2.

Figure 7:
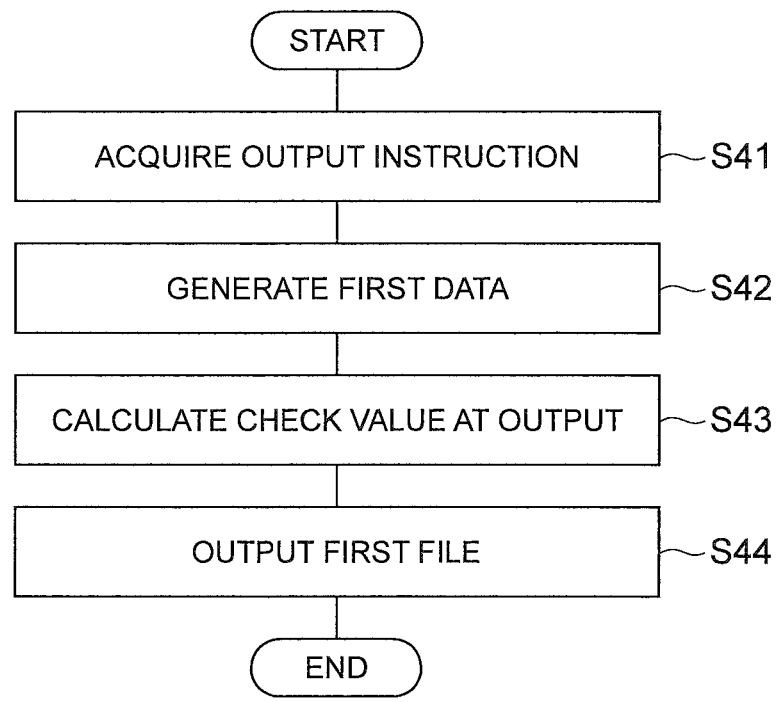
FIG. 7 is a flowchart illustrating a procedure for outputting a backup file.

As illustrated in FIG. 7, the backup output unit 37 acquires the instruction of outputting the backup file (S41). The output instruction is input to the input unit 51 by a user and is acquired by the backup output unit 37 via the transmission and reception unit 50 and the transmission and reception unit 30.

Next, the backup output unit 37 generates the first data corresponding to the storage content of the nonvolatile storage unit 31 (S42). The first data may correspond to all the storage content or to a part of the storage content.

Next, the security management unit 34C acquires the first data from the backup output unit 37 and performs predetermined calculation on the first data, thereby calculating the check value (S43). This check value is hereinafter referred to as "check value at the output". The check value is, for example, the CRC (Cyclic Redundancy Check) value.

Next, the backup output unit 37 outputs the first file to the storage medium for the backup via the transmission and reception unit 30 and the transmission and reception unit 50 (S44). The first file includes the first data, the check value at the output, and the memory ID of the nonvolatile storage unit 31. The output of the backup file is thus completed. The order of Steps S41 to S44 can be changed as appropriate.

(Procedure for recovery of storage content) In the case of resetting the state back to the initial state, for example, the storage content is recovered by the backup input unit 38 and the security management unit 34C. Before this process, the storage medium for the recovery is inserted into the connector 53 of the teaching pendant 5. Note that the storage medium for the recovery may be connected to the controller 2 alternatively.

The storage medium for the recovery stores the first file output by the backup output unit 37. However, it may be possible that the storage medium storing a file different from the first file is inserted; therefore, the file stored in the storage medium for the recovery is called a second file for the convenience. The second file includes second data, a check value for comparison, and the memory ID for comparison. When the first file and the second file coincide with each other, the second data coincides with the first data, the check value for comparison coincides with the check value at the output, and the memory ID for comparison coincides with the memory ID of the nonvolatile storage unit 31.

Figure 8:
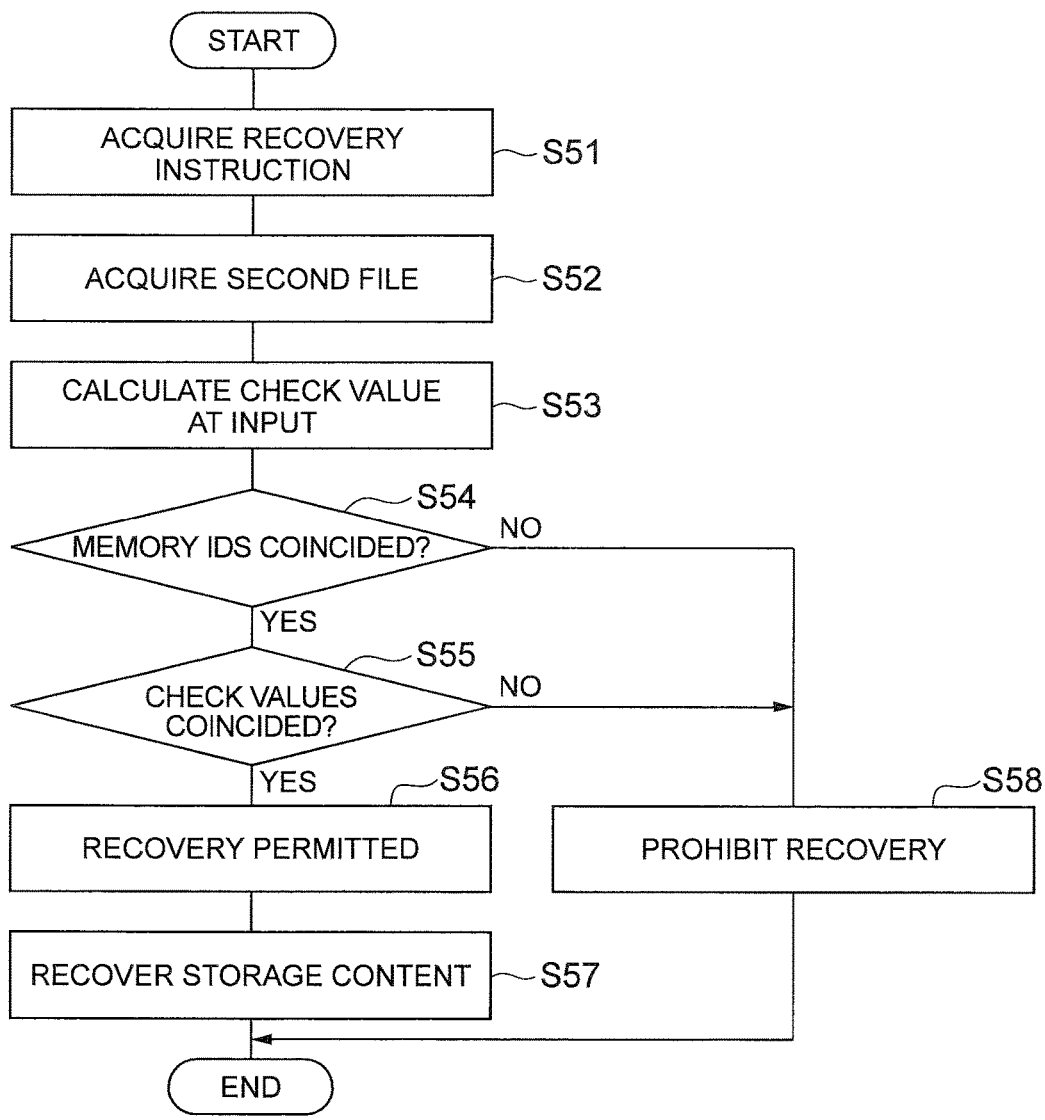
FIG. 8 is a flowchart illustrating a procedure for recovering the storage content.

As illustrated in FIG. 8, the backup input unit 38 acquires the instruction of recovering the storage content (S51). The recovery instruction is input to the input unit 51 by a user, and acquired by the backup input unit 38 via the transmission and reception unit 50 and the transmission and reception unit 30.

Upon the acquisition of the recovery instruction, the backup input unit 38 acquires the second file from the storage medium via the transmission and reception unit 50 and the transmission and reception unit 30 (S52).

Next, the security management unit 34C performs the predetermined calculation on the second data of the second file, thereby calculating the check value (S53). That is, the security management unit 34C performs the same calculation as the calculation of the check value at the output, thereby calculating the check value. This check value is hereinafter called "check value at the input".

Next, the security management unit 34C checks if the memory ID of the nonvolatile storage unit 31 coincides with the memory ID for comparison included in the second file (S54). When the memory IDs do not coincide with each other, the security management unit 34C prohibits the recovery of the storage content (S58) and cancels the process. Thus, it is prevented that the data generated as the first data in another controller 2 is written in the nonvolatile storage unit 31.

When the memory IDs coincide with each other, the security management unit 34C checks if the check value at the output coincides with the check value at the input. If the check values do not coincide with each other, the recovery of the storage content is prohibited (S58), and the process is cancelled. Thus, it is prevented that the second data that does not coincide with the first data is written in the nonvolatile storage unit 31. In other words, the data modified after being generated as the first data is eliminated.

When the check values coincide with each other, the security management unit 34C permits the recovery of the storage content (S56). In this manner, the security management unit 34C conducts third security check for determining whether the recovery of the storage content is permitted or prohibited.

Once the security management unit 34C permits the recovery of the storage content, the backup input unit 38 recovers the storage content of the nonvolatile storage unit 31 on the basis of the second data (S57). For example, the backup input unit 38 overwrites the data in the nonvolatile storage unit 31 with the second data. Thus, the recovery of the storage content is completed. The order of Steps S51 to S58 can be changed as appropriate.

As described above, the hardware key 6 is used for determining whether the operation input in the first maintenance mode is permitted or prohibited in the controller 2 and the security management system 1 having the controller 2. Thus, the storage content of the nonvolatile storage unit 31 can be managed with high reliability.

Meanwhile, the hardware key 6 is not used for determining whether the operation input in the second maintenance mode is permitted or prohibited. Therefore, the operation input in the second maintenance mode can be permitted or prohibited without the complicated operation using the hardware key 6. Thus, the operation in the second maintenance mode can be completed promptly and the stop period of the controller 2 due to the update of the storage content of the nonvolatile storage unit 31 can be shortened.

Since the operable range in the second maintenance mode is narrower than that in the first maintenance mode, the reliability of the management of the storage content of the nonvolatile storage unit 31 can be maintained even though the operation input in the second maintenance mode is permitted or prohibited without using the hardware key 6. Accordingly, the storage content of the nonvolatile storage unit 31 can be managed with high reliability while the complication of the operation is suppressed.

The security management unit 34A prohibits the operation input in the first maintenance mode if at least one of the following is satisfied: the input password is not the password included in the license file; and the date information output from the electronic calendar 35 is after the expiration date of the license file. Therefore, even though the password of a certain hardware key 6 has leaked out, the leaked password can be invalidated by updating the license file in the hardware key 6 with the use of the license file generated using a new password. Moreover, by giving the expiration date to the license file, the same password can be prevented from being used for a long time, and even when the password has leaked out, the password cannot be used after the expiration date, so that the risk can be reduced more certainly. Therefore, the operation input in the first maintenance mode can be restricted with high reliability.

The security management unit 34A prohibits the operation input in the first maintenance mode even when the key ID of the hardware key 6 does not coincide with the key ID for comparison included in the license file. Therefore, the duplication of the license file in another hardware key 6 is prevented. This allows more strict management of the license files, so that the operation input in the first maintenance mode can be restricted with higher reliability.

The security management unit 34B prohibits the operation input in the second maintenance mode if at least one of the following is satisfied: the memory ID of the nonvolatile storage unit 31 does not coincide with the memory ID for comparison of the security code; and the date information output from the electronic calendar 35 is after the expiration date of the security code. Therefore, by using the memory ID of the nonvolatile storage unit 31, the operation input in the second maintenance mode can be restricted with high reliability without complicated operation. Moreover, by giving the expiration date to the security code, the period for which the operation input in the second maintenance mode is permitted can be limited. Therefore, the operation input in the second maintenance mode can be restricted with higher reliability without complicating the operation.

The calendar monitor unit 36 restricts the shift of the current time toward the past, after the initial setting of the date information of the electronic calendar 35 is done. Thus, the license file or the security code that has expired can be detected with high reliability, so that the operation input in the first maintenance mode or the second maintenance mode can be restricted with higher reliability.

The backup output unit 37 outputs the first file including the first data and the memory ID of the nonvolatile storage unit 31. The backup input unit 38 acquires the second file including the second data and the memory ID for comparison, and recovers the storage content of the nonvolatile storage unit 31 on the basis of the second data. Thus, the operation for the storage content of the nonvolatile storage unit 31 can be permitted without requiring the input of the security check as long as the operation is for the recovery of the storage content.

The security management unit 34C prohibits the recovery of the storage content if at least one of the following is satisfied: the memory ID for comparison included in the second file does not coincide with the memory ID of the nonvolatile storage unit 31; and the check values obtained by performing the same calculation on the first data and the second data do not coincide with each other. Thus, the operation other than the recovery of the storage content is restricted with high reliability.

The information for each user stored in the user information storage unit 81 may include the degree of reliability of the user. The license file generation unit 82 may extend the expiration date of the license file as the degree of reliability of the user that requests for the license file gets higher. Similarly, the security code generation unit 83 may extend the expiration date of the security code as the degree of reliability of the user that requests for the security code gets higher. In this case, by extending the expiration date of only the users with high degree of reliability, the complication of the operation of the control device can be further suppressed while the deterioration in reliability is suppressed. Note that the reliability can be set on the basis of the length of the period for which the user has been registered in the data generation device 8, or the history of unauthorized use.

The embodiment has been described so far; however, the present invention is not limited to the embodiment only and may be changed variously without departing from the gist thereof. The target to be controlled by the controller 2 is not limited to the articulated robot but may be an NC machine tool, for example.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

What is claimed is:

1. A security management system comprising:
    a control device comprising:
        a control calculation unit that performs calculation on a basis of storage content of a nonvolatile storage unit and controls a machine;
        an update unit that accepts operation input in a first maintenance mode or a second maintenance mode, the second maintenance mode having an operable range, and updates the storage content of the nonvolatile storage unit in accordance with the operation input;
        a first security management unit that determines permission or prohibition of the operation input in the first maintenance mode with the use of a hardware key; and
        a second security management unit that determines permission or prohibition of the operation input in the second maintenance mode without the use of the hardware key;
    a data generation device that generates a license file or a security code; and
    a terminal device that writes the license file generated by the data generation device in the hardware key, wherein
    the hardware key stores the license file including the password and an expiration date,
    the first security management unit prohibits the operation input in the first maintenance mode if at least one of the following is satisfied: an input password is not the password included in the license file; and date information output from an electronic calendar is after the expiration date of the license file,
    the nonvolatile storage unit has a unique identifier,
    the second security management unit acquires the security code including an identifier for comparison and an expiration date, and prohibits the operation input in the second maintenance mode if at least one of the following is satisfied: the unique identifier of the nonvolatile storage unit does not coincide with the identifier for comparison of the security code; and the date information output from the electronic calendar is after the expiration date of the security code, and
    the data generation device includes a user information storage unit that stores a reliability for each user, the reliability being based on an amount of time the user has been registered or a history of the user, and extends the expiration date included in the license file or the security code as the reliability of the user that requests the license file or the security code gets higher.

2. A security management method for a control device that has a nonvolatile storage unit and controls a machine on a basis of storage content of the nonvolatile storage unit, the method comprising:
    accepting operation input in a first maintenance mode or a second maintenance mode, the second maintenance mode having an operable range, and updating the storage content of the nonvolatile storage unit in accordance with the operation input;
    conducting first security check that determines permission or prohibition of the operation input in the first maintenance mode with the use of a hardware key before updating the storage content in the first maintenance mode;
    conducting second security check that determines permission or prohibition of the operation input in the second maintenance mode without the use of the hardware key before updating the storage content in the second maintenance mode;
    generating a license file including a password and an expiration date before the first security check;
    writing the generated license file in the hardware key; and
    generating a security code including an identifier for comparison and an expiration date before the second security check, wherein
    the operation input in the first maintenance mode is prohibited in the first security check if at least one of the following is satisfied: a password input to the control device is not the password of the license file; and date information output from an electronic calendar of the control device is after the expiration date of the license file,
    the operation input in the second maintenance mode is prohibited in the second security check if at least one of the following is satisfied: a unique identifier of the nonvolatile storage unit does not coincide with the identifier for comparison of the security code; and the date information output from the electronic calendar is after the expiration date of the security code, and
    the expiration date included in the license file or the security code is extended as a reliability of the user that requests for the license file or the security code gets higher, the reliability being based on an amount of time the user has been registered or a history of the user.

3. The security management system according to claim 1, wherein
    the hardware key has a unique identifier,
    the license file further includes an identifier for comparison, and
    the first security management unit prohibits the operation input in the first maintenance mode also when the unique identifier of the hardware key does not coincide with the identifier for comparison of the license file.

4. The security management system according to claim 1, further comprising:
    a backup output unit that outputs a first file including first data corresponding to the storage content and the unique identifier of the nonvolatile storage unit;

a backup input unit that acquires a second file including second data and an identifier for comparison and recovers the storage content on a basis of the second data; and a third security management unit that prohibits the recovery of the storage content if at least one of the following is satisfied: the identifier for comparison included in the second file does not coincide with the unique identifier of the nonvolatile storage content; and check values obtained by performing the same calculation on the first data and the second data do not coincide with each other.

5. The security management system according to claim 1, wherein the reliability is based on the amount of time the user has been registered in the data generation device.

6. The security management system according to claim 1, wherein the reliability is based on the history of the user.

7. The security management system according to claim 1, wherein the control device is configured to control a robot or a machine tool.

8. The security management system according to claim 1, wherein the hardware key is provided separately from the control unit.

9. The security management system according to claim 8, further comprising a connector configured to receive the hardware key.

10. The security management system according to claim 9, wherein the connector is provided in the terminal device or a teaching pendant.

11. The security management method according to claim 2, wherein an identifier for comparison is further included in the license file, and the operation input in the first maintenance mode is prohibited in the first security check also when a unique identifier of the hardware key does not coincide with the identifier for comparison of the license file.

12. The security management method according to claim 2, further comprising:

outputting a first file including first data corresponding to the storage content and the unique identifier of the nonvolatile storage unit;

acquiring a second file including second data and an identifier for comparison and recovering the storage content on a basis of the second data; and prohibiting the recovery of the storage content if at least one of the following is satisfied: the identifier for comparison included in the second file does not coincide with the unique identifier of the nonvolatile storage content; and check values obtained by performing the same calculation on the first data and the second data do not coincide with each other.

13. The security management method according to claim 2, wherein the reliability is based on the amount of time the user has been registered in the data generation device.

14. The security management method according to claim 2, wherein the reliability is based on the history of the user.

15. The security management method according to claim 2, further comprising controlling a robot or a machine tool with the control device.

16. The security management method according to claim 2, wherein the hardware key is provided separately from the control unit.

17. The security management method according to claim 16, further comprising receiving the hardware key by a connector.

18. The security management method according to claim 17, wherein the connector is provided in the terminal device or a teaching pendant.

* * * * *